United States Patent Office 3,102,023
Patented Aug. 27, 1963

3,102,023
HERBICIDAL METHOD
Angelo John Speziale and John P. Chupp, Kirkwood, Mo., assignors to Monsanto Chemical Company, St. Louis, Mo., a corporation of Delaware
No Drawing. Filed Nov. 9, 1960, Ser. No. 68,160
7 Claims. (Cl. 71—2.7)

This invention relates to methods of inhibiting the germination and preemergent growth of plants and in particular inhibiting the germination and preemergent growth of grasses in contact with soil which methods comprise treating the soil with a herbicidal amount of an S-(carbamoylmethyl) phosphorothioate of the structure

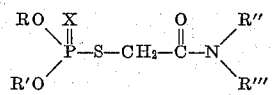

wherein R, R', R" and R''' are like or unlike alkyl or alkoxyalkyl radicals containing from 1 to 4 carbon atoms (e.g. methyl, ethyl, propyl, butyl, methoxyethyl, ethoxyethyl, methoxypropyl, and the various isomeric forms thereof) and wherein X is a chalkogen of atomic weight less than 40 (i.e. sulfur or oxygen, preferably sulfur). It is preferred that R, R', R" and R''' be straight chain alkyl radicals containing from 2 to 3 carbon atoms.

These S-(carbamoylmethyl) phosphorothioates can be prepared by reacting a salt (e.g. ammonium or alkali metal such as sodium, potassium or lithium) of a phosphorothioic acid of the structure

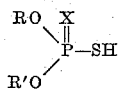

wherein R, R' and X have the aforedescribed significance with a substantially equimolecular amount of an alphahalo acetamide of the structure

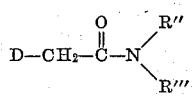

wherein R" and R''' have the aforedescribed significance and wherein D is a halogen having an atomic number in the range of 16 to 36 (i.e. chlorine or bromine). Where and when desired an inert organic solvent such as acetone, butanone, dioxane, benzene, toluene, xylene, etc. may be used. While a wide range of reaction temperatures can be employed provided the system is fluid (i.e. the temperature is maintained above the freezing point of the system up to and including its boiling point) it is preferred to employ a reaction temperature in the range of from 20° C. to 120° C.

As illustrative of the preparation of the aforedescribed phosphorothioates is the following.

EXAMPLE I

To a suitable reaction vessel equipped with a thermometer, agitator and reflux condenser is charged approximately 23.3 parts by weight (substantially 0.115 mol.) of ammonium O,O-diethyl phosphorodithioate, approximately 10.5 parts by weight (substantially 0.087 mol.) of alpha-chloro N,N-dimethyl acetamide, and approximately 80 parts by weight of acetone. While agitating the so-charged mass is heated up to the reflux temperature and then refluxed for 4 hours. The reaction mass is then cooled to room temperature and filtered. The filter cake is washed with acetone and the washings combined with the original filtrate, and the resulting mixture stripped of acetone under vacuum. The residue is then taken up with methylene dichloride and the solution so obtained washed first with 5% aqueous sodium carbonate and then with water. Upon vacuum stripping the methylene dichloride from the so-washed solution there is obtained 18.9 parts by weight of O,O-diethyl S-(N,N-dimethylcarbamoylmethyl) phosphorodithioate

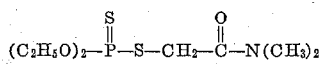

an oil which is soluble in acetone but insoluble in water.
Analysis.—Theory: 23.6% S, 11.4% P. Found: 23.9% S, 11.4% P.

Employing the procedure of Example I but replacing ammonium O,O-diethyl phosphorodithioate with an equimolecular amount of potassium O,O-dimethyl phosphorodithioate there is obtained O,O-dimethyl S-(N,N-dimethylcarbamoylmethyl) phosphorodithioate which is insoluble in water.

EXAMPLE II

To a suitable reaction vessel equipped with a thermometer, agitator and reflux condenser is charged approximately 23.3 parts by weight (substantially 0.115 mol.) of ammonium O,O-diethyl phosphorodithioate, approximately 14.9 parts by weight (substantially 0.1 mol.) of alpha-chloro N,N-diethyl acetamide, and approximately 80 parts by weight of acetone. While agitating the so-charged mass is heated to the reflux temperature and refluxed for about 4 hours. The reaction mass is then cooled to room temperature and filtered. The filter cake is washed with acetone and the washings combined with the original filtrate, and the solution then stripped of acetone under vacuum. The residue is then taken up with methylene dichloride, and the solution so obtained washed first with 5% aqueous sodium carbonate and then with water. Upon vacuum stripping the methylene dichloride from the so-washed solution there is obtained 28.5 parts by weight of O,O-diethyl S-(N,N-diethylcarbamoylmethyl) phosphorodithioate

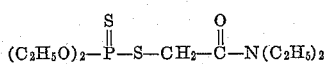

an oil which is soluble in acetone but insoluble in water
Analysis.—Theory: 10.35% P, 21.4% S. Found: 10.2% P, 21.3% S.

Employing the procedure of Example II but replacing ammonium O,O-diethyl phosphorodithioate with an equimolecular amount of potassium O,O-di-n-propyl phosphorodithioate there is obtained O,O-di-n-propyl S-(N,N-diethylcarbamoylmethyl) phosphorodithioate, an oil which is insoluble in water.

Employing the procedure of Example II but replacing ammonium O,O - diethyl phosphorodithioate with an equimolecular amount of potassium O,O-di(2-methoxyethyl) phosphorodithioate there is obtained O,O-di(2-methoxyethyl) S-(N,N - diethylcarbamolymethyl) phosphorodithioate, an oil which is insoluble in water.

Employing the procedure of Example II but replacing ammonium O,O-diethyl phosphorodithioate with an equimolecular amount of ammonium O,O-diethyl phosphorothioate there is obtained O,O-diethyl S-(N,N-diethylcarbamoylmethyl) phosphorothioate

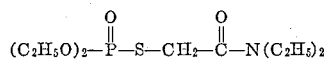

EXAMPLE III

To a suitable reaction vessel equipped with a thermometer, agitator and reflux condenser is charged approximately 18.3 parts by weight (substantially 0.09 mol.) of ammonium O,O-diethyl phosphorodiothioate, approximately 16.4 parts by weight (substantially 0.08 mol.) of alpha-chloro N,N-di-n-butyl acetamide, and approximately 80 parts by weight of acetone. While agitating the so-charged mass is heated to the reflux temperature and refluxed for 4 hours. The reaction mass is then cooled to room temperature and filtered. The filter cake is washed with acetone and the washings combined with the original filtrate, and the solution then stripped of acetone under vacuum. The residue is then taken up with methylene dichloride, and the solution washed first with 5% aqueous sodium carbonate and then with water. Upon vacuum stripping the methylene dichloride from the so-washed solution there is obtained 27.4 parts by weight of O,O-diethyl S-(N,N-di-n-butylcarbamoylmethyl) phosphorodithioate, an oil which is soluble in acetone but insoluble in water.

*Analysis.*—Theory: 8.7% P, 18.0% S. Found: 8.7% P, 18.3% S.

Employing the procedure of Example III but replacing alpha-chloro N,N-di-n-butyl acetamide with an equimolecular amount of alpha-bromo N,N-di(2-ethoxyethyl) acetamide there is obtained O,O-diethyl S-[N,N-di(2-ethoxyethyl)carbamoylmethyl] phosphorodithioate, an oil which is insoluble in water.

EXAMPLE IV

To a suitable reaction vessel equipped with a thermometer, agitator and reflux condenser is charged approximately 22.2 parts by weight (substantially 0.11 mol.) of ammonium O,O-diethyl phosphorodithioate, approximately 17.7 parts by weight of alpha-chloro N,N-di-n-propyl acetamide, and approximately 80 parts by weight of acetone. While agitating the so-charged mass is heated to the reflux temperature and refluxed for 4 hours. The reaction mass is cooled to room temperature and filtered. The filter cake is washed with acetone, the washings combined with the original filtrate and the solution stripped of acetone under vacuum. The residue is then taken up with methylene dichloride and the solution washed first with 5% aqueous sodium carbonate and then with water. The methylene dichloride is then vacuum stripped from the so-washed solution. The residue (29.1 parts by weight) is O,O-diethyl S-(N,N-di-n-propylcarbamoylmethyl), an oil which is soluble in acetone but insoluble in water.

*Analysis.*—Theory: 9.5% P, 19.6% S. Found: 9.2% P, 19.4% S.

Employing the procedure of Example IV but replacing alpha-chloro N,N-di-n-propyl acetamide with an equimolecular amount of alpha-bromo N,N-diisopropyl acetamide there is obtained O,O-diethyl S-(N,N-diisopropylcarbamoylmethyl) phosphorodithioate, an oil which is insoluble in water.

The methods by which the carbamoyl phosphorothioates of this invention are isolated from reaction mixtures containing same will vary slightly with the reactants employed and the product produced. Further purification by solvent extractions or by absorptive agents such as activated carbon or clays can precede the removal of the inert inorganic solvent. Additionally an inert organic solvent can be added also in the purification by absorptive agents. However, in general the reaction product is satisfactory for herbicidal purposes without further purification.

As aforementioned the carbamoylmethyl phosphorothioates of this invention are useful for inhibiting the germination and preemergent growth of plants from seed in contact with soil and to illustrate their relative activity in soil the following test procedure was employed.

Seeds of several different plants (itemized hereinafter) each representing a principal botanical species are planted in aluminum pans (9½" x 5¼" x 2¾"). A good grade of top soil which has been treated with 0.05% of a resinous polyelectrolyte soil conditioner is compacted to a depth of ⅜" from the top of the pan. The grass seeds are scattered randomly over one-half of the soil surface and the broadleaf seeds are scattered randomly over the remaining one-half of the soil surface. The seeds are then covered with ⅜" of the prepared soil mixture and the pan leveled.

The leveled surface of the soil in the pan is then sprayed with 15 cc. of acetone containing the test compound dissolved therein at a definite rate in pounds per acre.

After spraying the soil surface, the pan is placed in a sand bench and ½" of water added to the bench. The soil absorbs moisture through perforations in the bottom until the soil surface is about one-half moist, by which time the excess water in the sand bench is drained off. The remaining soil surface is moistened by capillary action.

Fourteen days after application of the test compound the results are observed and recorded. The number of plants of each species which germinated and grew are counted and converted to a herbicidal rating by means of a fixed scale based on average percent germination. (Germination rates are established for all new seed lots and periodic checks run on old seed in current use.) The scale used is as follows:

*Herbicidal Rating—Conversion Scale*

| Seed Lot, Percent Germination (Control) | 3 | 2 | 1 | 0 |
|---|---|---|---|---|
| | (Number of plants surviving) | | | |
| 100 | 0–5 | 6–10 | 11–15 | 16–20 |
| 90 | 0–5 | 6–9 | 10–13 | 14–20 |
| 80 | 0–4 | 5–8 | 9–12 | 13–20 |
| 70 | 0–4 | 5–7 | 8–11 | 12–20 |
| 60 | 0–3 | 4–6 | 7–9 | 10–20 |
| 50 | 0–3 | 4–5 | 6–8 | 9–20 |
| 40 | 0–2 | 3–4 | 5–6 | 7–20 |

The relative value of each test compound with respect to its herbicidal effect on each plant is indicated by a number as follows:

0 . . . No germination inhibition.
1 . . . Slight germination inhibition.
2 . . . Moderate germination inhibition.
3 . . . Severe germination inhibition.

In the following tables of herbicidal evaluation the test compounds are represented by code letters as follows:

| Test Compound | Code |
|---|---|
| O,O-diethyl S-(N,N-dimethylcarbamoylmethyl) phosphorodithioate | A |
| O,O-diethyl S-(N,N-diethylcarbamoylmethyl) phosphorothioate | B |
| O,O-diethyl S-(N,N-di-n-propylcarbamoylmethyl) phosphorodithioate | C |
| O,O-diethyl S-(N,N-di-n-butylcarbamoylmethyl) phosphorodithioate | D |

Table I illustrates the germination inhibition obtained upon applying the test compound at a rate of 25 lbs. per acre while Table II illustrates the germination inhibition obtained upon applying the test compound at a rate of 5 lbs. per acre.

TABLE I
*Extent [1] of Germination Inhibition Employing Compound*

| Plant | A | B |
|---|---|---|
| Morning Glory | 1 | 1 |
| Wild Oat | 3 | 3 |
| Brome Grass | 3 | 3 |
| Rye Grass | 3 | 3 |
| Radish | 1 | 2 |
| Sugar Beet | 3 | 3 |
| Foxtail | 3 | 3 |
| Crab Grass | 3 | 3 |
| Pigweed | 3 | 3 |
| Soybean | 3 | 3 |
| Wild Buckwheat | 2 | 2 |
| Tomato | 2 | 1 |
| Sorghum | 3 | 3 |

[1] 3—severe; 2—moderate; 1—slight; 0—no.

TABLE II
*Extent [1] of Germination Inhibition Employing Compound*

| Plant | A | B | C | D |
|---|---|---|---|---|
| Morning Glory | 0 | 0 | 0 | 0 |
| Wild Oat | 0 | 0 | 1 | 0 |
| Brome Grass | 0 | 2 | 1 | 0 |
| Rye Grass | 0 | 3 | 2 | 1 |
| Radish | 0 | 0 | 0 | 0 |
| Sugar Beet | 0 | 0 | 0 | 0 |
| Foxtail | 3 | 3 | 3 | 3 |
| Crab Grass | 3 | 3 | 3 | 3 |
| Pigweed | 0 | 2 | 2 | 0 |
| Soybean | 0 | 2 | 1 | 0 |
| Wild Buckwheat | 0 | 0 | 0 | 0 |
| Tomato | 0 | 0 | 0 | 0 |
| Sorghum | 1 | 3 | 2 | 0 |

[1] 3—severe; 2—moderate; 1—slight; 0—no.

To further illustrate this invention seeds of several different plants (itemized hereinafter) each representing a principal botanical species are planted in aluminum pans (9½″ x 5¼″ x 2¾″). A good grade of top soil which has been treated with 0.05% of a resinous polyelectrolyte soil conditioner is compacted to a depth of ⅜″ from the top of the pan. The grass seeds are scattered randomly over one-half of the soil surface and the broadleaf seeds are scattered randomly over the remaining one-half of the soil surface. The seeds are then covered with 450 grams of the aforementioned top soil in intimate admixture with the test compound and the pan leveled. The amount of test compound so added is equivalent to an application rate of one pound per acre.

After leveling the soil surface, the pan is placed in a sand bench and ½″ of water added to the bench. The soil absorbs moisture through perforations in the bottom until the soil surface is about one-half moist, by which time the excess water in the sand bench is drained off. The remaining soil surface is moistened by capillary action.

Fourteen days after application of the test compound the results are observed and recorded. The number of plants of each species which germinated and grew are counted and converted to a herbicidal rating by means of a fixed scale based on average percent germination. (Germination rates are established for all new seed lots and periodic checks run in old seed in current use.) The scale used is as follows:

*Herbicidal Rating—Conversion Scale*

| Seed Lot, Percent Germination (Control) | 3 | 2 | 1 | 0 |
|---|---|---|---|---|
| | (Number of plants surviving) | | | |
| 100 | 0–5 | 6–10 | 11–15 | 16–20 |
| 90 | 0–5 | 6–9 | 10–13 | 14–20 |
| 80 | 0–4 | 5–8 | 9–12 | 13–20 |
| 70 | 0–4 | 5–7 | 8–11 | 12–20 |
| 60 | 0–3 | 4–6 | 7–9 | 10–20 |
| 50 | 0–3 | 4–5 | 6–8 | 9–20 |
| 40 | 0–2 | 3–4 | 5–6 | 7–20 |

The relative value of each test compound with respect to its herbicidal effect on each plant is indicated by a number as follows:

0 .................... No germination inhibition.
1 .................... Slight germination inhibition.
2 .................... Moderate germination inhibition.
3 .................... Severe germination inhibition.

In the following table of herbicidal evaluation the test compounds have the same code letter significance as described hereinbefore.

*Extent [1] of Germination Inhibition Employing Compound*

| Plant | B | C |
|---|---|---|
| Wild Oat | 0 | 0 |
| Brome Grass | 0 | 3 |
| Rye Grass | 1 | 2 |
| Radish | 0 | 0 |
| Sugar Beet | 0 | 0 |
| Foxtail | 3 | 3 |
| Crab Grass | 2 | 3 |
| Pigweed | 0 | 0 |
| Soybean | 0 | 0 |
| Wild Buckwheat | 0 | 0 |
| Tomato | 0 | 0 |
| Sorghum | 1 | 3 |

[1] 3—severe; 2—moderate; 1—slight; 0—no.

From the foregoing evaluation data it is apparent that the carbamoyl phosphorothioates are effective pre-emergence herbicides. Valuable herbicidal effects will be observed by applications of small amounts, for example, as low as 0.25 lb. of active component per acre as well as high concentrations, for example 100 lbs. per acre. The selective activity on grasses is exhibited at lower rates of application, for example from 0.5 to 15 lbs. per acre. For general application and herbicidal effect on both the grasses and dicotyledonous plants, it will be found necessary to use from 10 to 50 lbs. per acre.

Selective herbicidal activity with respect to several genera of grasses is illustrated by the data in Table III. Other experiments run with respect to plants of different genera, which have different metabolisms and physical characteristics indicate little or no inhibition of growth. The botanical types, or genera, of grasses which are effectively controlled by means of the phosphorothioates of this invention, embrace a large number of undesirable plants, or weeds, frequently found in vegetable crops. This invention, however, is not limited to removing grasses from broad leaf plants since the selective activity will be useful in removing weeds from corn, which belongs to a different genus of grass. Many other crops and particularly the broad leaved plants are inhibited by weeds of the crab grass and rye genera, which weeds can be effectively controlled by the practice of this invention. In some instances there are minor herbicidal effects on dicotyledonous plants, and therefore optimum results may depend to some extent on experience with respect to the activity of the particular carbamoyl phosphorothioate on the vegetable crop to be treated.

It will be apparent that quite different effects can be obtained by modifying the method of use. For this reason an essential part of this invention is the formulation so as to permit a uniform predetermined application of herbicide to the surface or sub-surface of the soil or other growth media so as to produce the desired effect. By proper selection and proportioning of the various extending agents either liquid or solid formulations can be prepared so as to adapt the herbicide for achieving the desired result with any conventional device for treating the surface or sub-surface of the soil or other growth media.

Although the phosphorothioates of this invention are useful per se in controlling the germination and preemergent growth of a wide variety of plants, it is preferable that they be supplied to the soil or other plant growing media in a dispersed form in a suitable extending agent.

In the instant specification and appended claims it is to be understood that the term "dispersed" is used in its widest possible sense. When it is said that the phosphorothioates of this invention are dispersed, it means that the particles of the phosphorothioates of this invention may be molecular in size and held in true solution in a suitable organic solvent. It means further that the particles may be colloidal in size and distributed throughout a liquid phase in the form of suspensions or emulsions or in the form of particles held in suspension by wetting agents. The term "dispersed" also means that the particles may be mixed with and distributed throughout a solid carrier providing a mixture in particulate form, e.g. pellets, granules, powders, or dusts.

In the instant specification and appended claims it is to be understood that the expression "extending agent" includes any and all of those substances in which the phosphorothioates of this invention are dispersed. It includes therefore, the solvents of a true solution, the liquid phase of suspensions, or emulsions and the solid phase of particulate solids, e.g. pellets, granules, dusts and powders.

The exact concentration of the phosphorothioates of this invention employed in combatting or controlling noxious vegetation can vary considerably provided the required dosage (i.e. herbicidal amount) thereof is supplied to the plant growing medium. From a practical point of view, the manufacturer must supply the agriculturist with a low-cost concentrate or spray base or particulate solid base in such form that, by merely mixing with water or solid extender (e.g. powdered clay or talc) or other low-cost material available to the agriculturist at the point of use, he will have an easily prepared herbicidal spray or particulate solid. In such a concentrate composition, the phosphorothioate generally will be present in a concentration of 5 to 95 percent by weight, the residue being any one or more of the well-known herbicidal adjuvants, such as the various surface active agents (e.g. detergents, a soap or other emulsifying or wetting agent), surface active clays, solvents, diluents, carrier media, adhesives, spreading agents, humectants, and the like.

There are a large number of organic liquids which can be used for the preparation of solutions, suspensions or emulsions of the phosphorothioates of this invention. For example, isopropyl, ether, acetone, methyl ethyl ketone, dioxane, cyclohexanone, carbon tetrachloride, ethylene dichloride, tetrachloroethane, hexane heptane and like higher liquid alkanes, hydrogenated naphthalenes, solvent naphtha, benzene, toluene, xylene, petroleum fractions (e.g. those boiling almost entirely under 400° F. and having a flash point above about 80° F., particularly kerosene), mineral oils and the like.

The phosphorothioates of this invention are preferably supplied to the plant growing medium in the form of emulsions or suspensions. Emulsions or suspensions are prepared by dispersing the phosphorothioate of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York), in place of the expression "emulsifying agent," to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edition, page 280). These surfactants include the well-known capillary active substances which may be anion-active (or anionic), cation-active (or cationic), or non-ionizing (or non-ionic) which are described in detail in volumes I and II of Schwartz, Perry and Berch's "Surface Active Agents and Detergents" (1958, Interscience Publishers, Inc., New York) and also in the November 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to surfactants, i.e. the anion-active, cation-active and non-ionizing capillary active substances are incorporated in this specification by reference in order to avoid unnecessary enlargement of this specification. The preferred surfactants are the water-soluble anionic surface-active agents and the water-soluble non-ionic surface active agents set forth in U.S. 2,846,398 (issued August 5, 1958). In general it is preferred that a mixture of water-soluble anionic and water-soluble non-ionic surfactants be employed.

The phosphorothioates of this invention can be dispersed by suitable methods (e.g. tumbling or grinding) in solid extending agents either of organic or inorganic nature and supplied to the plant growing medium in particulate form. Such solid materials include for example, tricalcium phosphate, calcium carbonate, kaolin, bole, kieselguhr, talc, bentonite, fuller's earth, pyrophyllite, diatomaceous earth, calcined magnesia, volcanic ash, sulfur and the like inorganic solid materials and include for example, such materials of organic nature as powered cork, powdered wood, and powdered walnut shells. The preferred solid carriers are the adsorbent clays, e.g. bentonite. These mixtures can be used for herbicidal purposes in the dry form or by addition of water-soluble surfactants or wetting agents the dry particulate solids can be rendered wettable by water so as to obtain stable aqueous dispersions or suspensions suitable for use as sprays.

In all of the forms described above the dispersions can be provided ready for use in combatting noxious vegetation or they can be provided in a concentrated form suitable for mixing with or dispersing in other extending agents. As illustrative of a particularly useful concentrate is an intimate mixture of phosphorothioate of this invention with a water-soluble surfactant which lowers the surface tension of water in the weight proportions of 0.1 to 15 parts of surfactant with sufficient of the phosphorothioate of this invention to make 100 parts by weight. Such a concentrate is particularly adapted to be made into a spray for combatting various forms of noxious vegetation by the addition of water thereto. As illustrative of such a concentrate is an intimate mixture of 95 parts by weight of O,O-diethyl S-(N,N-di-n-propylcarbamoylmethyl) phosphorodithioate and 5 parts by weight of water-soluble non-ionic surfactant such as the polyoxyethylene derivative of sorbitan monolaurate.

Another useful concentrate adapted to be made into a spray for combatting noxious vegetation is a solution (preferably as concentrated as possible) of a phosphorothioate of this invention in an organic solvent therefor. The said liquid concentrate preferably contains dissolved therein a minor amount (e.g. 0.5 to 10 percent by weight of the weight of the new herbicidal agent) of a surfactant (or emulsifying agent), which surfactant is also water-soluble. As illustrative of such a concentrate is a solution of O,O-diethyl S-(N,N-diethylcarbamoylmethyl) phosporodithioate in acetone which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well-known water-soluble alkali metal alkylaryl sulfonates as exemplified by sodium decylbenzene sulfonate and sodium dodecylbenzene sulfonate. Of the non-ionic surfactants the particularly preferred are the water-soluble polyoxyethylene derivatives of alkylphenols (particularly isooctylphenol) and the water-soluble polyoxyethylene derivatives of the mono-higher fatty acid esters of sorbitan containing 15 to 30 moles of ethylene oxide per mole of sorbitan mono-ester of alkylphenol.

In all of the various dispersions described hereinbefore for herbicidal purposes, the active ingredient can be one or more of the compounds of this invention. The compounds of this invention can also be advantageously employed in combination with other pesticides, including, for example, nematocides, bactericides, and insecticides. In this manner it is possible to obtain mixtures which are effective against a wide variety of pests and other forms of noxious life.

When operating in accordance with the present invention growth inhibiting amounts of the compound or a composition containing same are dispersed or distributed in any convenient fashion in soil or other growth media, for example by simple mixing with the soil or by applying to the surface of the soil and thereafter dragging or disking the soil to the desired depth, or by injection or drilling techniques whereby the phosphorothioate of this invention is deposited beneath the surface of the soil, or by employment of a liquid carrier (solvent or non-solvent) to accomplish the penetration and impregnation. The application of the spray and dust compositions to the surface of the soil may be accomplished by conventional methods, e.g. with power dusters, boom or hand sprayers or spray dusters.

While this invention has been described with respect to certain embodiments, it is to be understood that it is not so limited and that variations and modifications thereof obvious to those skilled in the art can be made without departing from the spirit and scope thereof.

What is claimed is:

1. The method of inhibiting the germination and pre-emergent growth of plants in contact with soil which comprises treating said soil with a herbicidal amount of a phosphorothioate of the structure

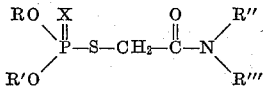

wherein R, R', R" and R'" are selected from the group consisting of alkyl and alkoxyalkyl radicals containing from 1 to 4 carbon atoms and wherein X is a chalkogen of atomic weight less than 40.

2. The method of inhibiting the germination and pre-emergent growth of plants in contact with soil which comprises treating said soil with a herbicidal amount of from 0.5 to 50 pounds per acre of a phosphorothioate of the structure

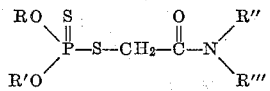

wherein R, R', R" and R'" are straight chain alkyl radicals containing 2 to 3 carbon atoms.

3. The method of claim 2 wherein the phosphorothioate is O,O-diethyl S-(N,N-diethylcarbamoylmethyl) phosphorodithioate.

4. The method of claim 2 wherein the phosphorothioate is O,O-diethyl S-(N,N-di-n-propylcarbamoylmethyl) phosphorodithioate.

5. The method of selectively inhibiting the germination of grass seeds in contact with soil and the preemergent growth thereof which comprises treating the soil with a grass growth inhibiting amount of from 0.5 to 15 pounds per acre of a phosphorothioate of the structure

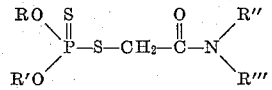

wherein R, R', R" and R'" are straight chain alkyl radicals containing 2 to 3 carbon atoms.

6. The method of claim 5 wherein the phosphorothioate is O,O-diethyl S-(N,N-diethylcarbamoylmethyl) phosphorodithioate.

7. The method of claim 5 wherein the phosphorothioate is O,O-diethyl S-(N,N-di-n-propylcarbamoylmethyl) phosphorodithioate.

References Cited in the file of this patent

UNITED STATES PATENTS

| | | |
|---|---|---|
| 2,494,283 | Cassaday et al. | Jan. 10, 1950 |
| 2,959,608 | Crouch et al. | Nov. 8, 1960 |
| 2,959,610 | Young et al. | Nov. 8, 1960 |

FOREIGN PATENTS

| | | |
|---|---|---|
| 164,112 | Sweden | July 22, 1958 |